United States Patent
Reeves et al.

(10) Patent No.: US 9,043,879 B1
(45) Date of Patent: May 26, 2015

(54) FACILITATING ENFORCEMENT OF PRL RESTRICTIONS

(75) Inventors: Raymond Emilio Reeves, Olathe, KS (US); Simon Youngs, Overland Park, KS (US); Gary Duane Koller, Overland Park, KS (US); Mark Douglas Peden, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 71 days.

(21) Appl. No.: 13/546,688

(22) Filed: Jul. 11, 2012

(51) Int. Cl.
*H04W 12/08* (2009.01)
*H04L 29/06* (2006.01)

(52) U.S. Cl.
CPC .............. *H04W 12/08* (2013.01); *H04L 63/20* (2013.01)

(58) Field of Classification Search
None
See application file for complete search history.

(56) References Cited

U.S. PATENT DOCUMENTS

| 8,108,916 B2* | 1/2012 | Fink et al. ................. 726/6 |
| 2004/0005892 A1* | 1/2004 | Mayer et al. ............. 455/432.1 |
| 2005/0282544 A1* | 12/2005 | Oommen et al. .......... 455/432.1 |
| 2008/0108321 A1* | 5/2008 | Taaghol et al. ............. 455/410 |

* cited by examiner

*Primary Examiner* — David Le

(57) ABSTRACT

Systems, methods, and computer-readable media for facilitating enforcement of PRL restrictions are provided. The method includes receiving a registration request from a user device. The registration request includes a device identifier that identifies the user device and a network identifier that identifies a network selected for use. The device identifier is used to reference a list of networks permitted for use or prohibited for use by the user device. Thereafter, it is determined that the network selected for use by the user device is unauthorized based on a comparison of the network identifier that identifies the network selected for use to the list of networks permitted or prohibited for use by the user device. Based on the determination that the network selected for use by the user device is unauthorized, the user device is prevented from utilizing the selected network for voice or data services.

20 Claims, 7 Drawing Sheets

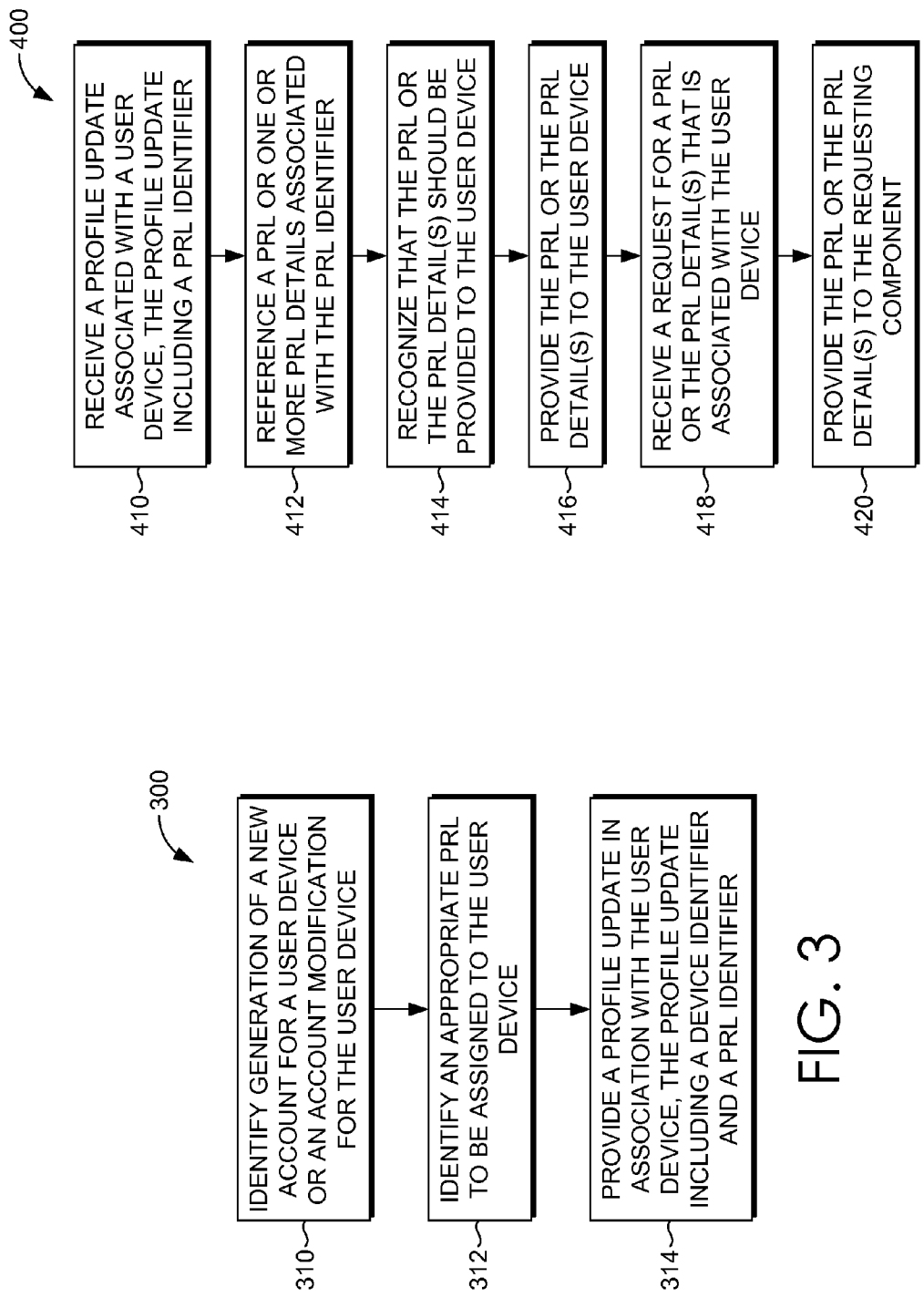

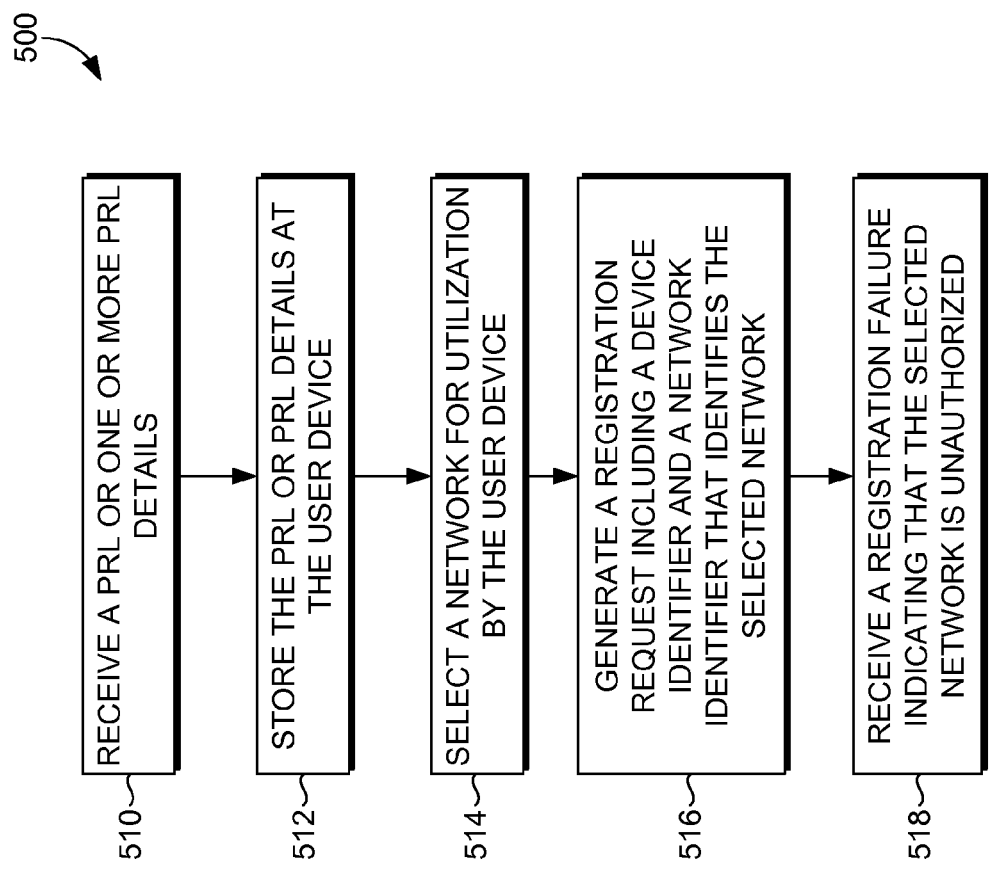

US 9,043,879 B1

FACILITATING ENFORCEMENT OF PRL RESTRICTIONS

BRIEF SUMMARY

A high-level overview of various aspects of the invention are provided here for that reason, to provide an overview of the disclosure, and to introduce a selection of concepts that are further described in the detailed-description section below. This summary is not intended to identify key features or essential features of the claimed subject matter, nor is it intended to be used as an aid in isolation to determine the scope of the claimed subject matter. In brief, and at a high level, this disclosure describes, among other things, facilitating enforcement of PRL restrictions. Utilizing embodiments hereof, a portion of a network, such as a data session registrar, is utilized to enforce PRL restrictions such that a mobile device is restricted from using an unauthorized or inappropriate network. Upon a mobile device requesting a data session, the data session registrar can verify that the network being attempted for use by the mobile device is appropriate.

BRIEF DESCRIPTION OF THE DRAWINGS

Illustrative embodiments of the present invention are described in detail below with reference to the attached drawing figures, and wherein:

FIG. 3 provides a first exemplary method for facilitating enforcement of PRL restrictions, in accordance with an embodiment of the present invention;

FIG. 4 provides a second exemplary method for facilitating enforcement of PRL restrictions, in accordance with an embodiment of the present invention;

FIG. 5 provides a third exemplary method for facilitating enforcement of PRL restrictions, in accordance with an embodiment of the present invention;

DETAILED DESCRIPTION

Figure 1:
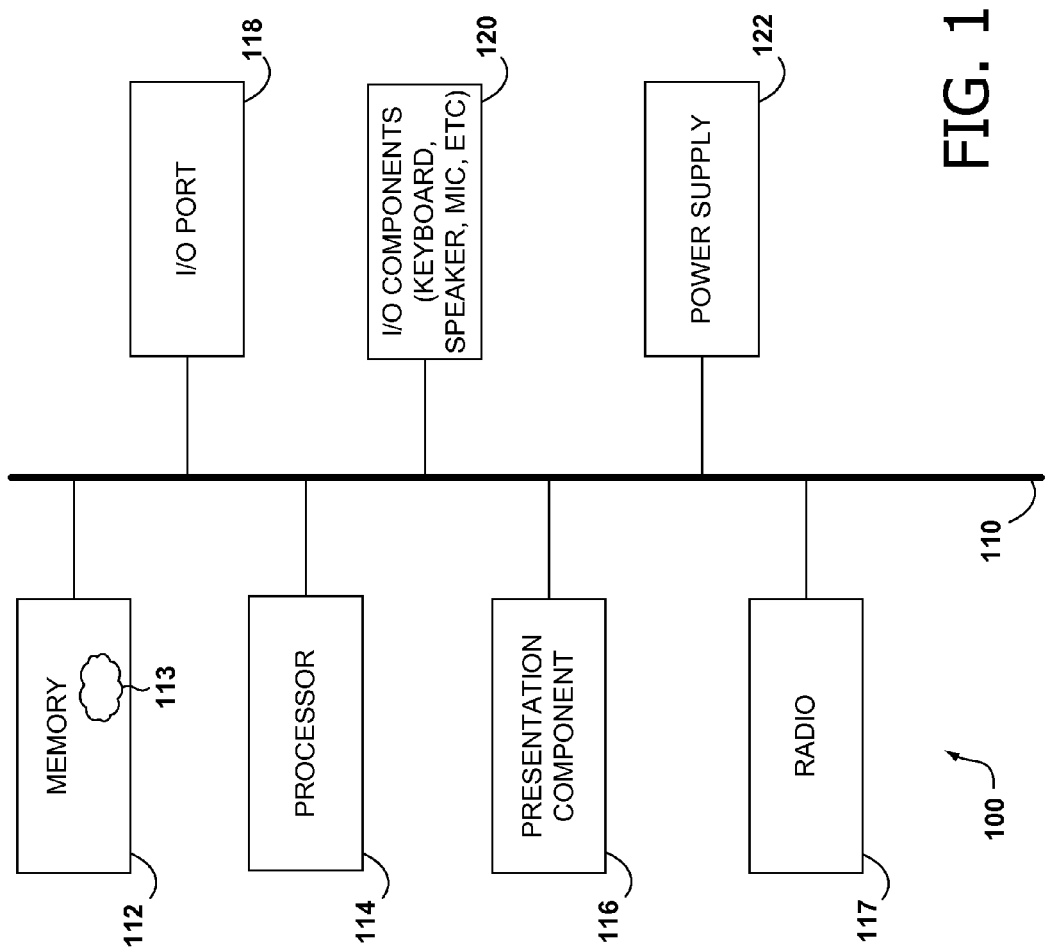
FIG. 1 depicts an exemplary computing device according to embodiments of the present invention.

The subject matter of the present invention is described with specificity herein to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of the methods employed, the terms should not be interpreted as implying any particular order among or between various steps herein disclosed unless and except when the order of individual steps is explicitly described.

Embodiments of the present invention provide systems, methods, and computer-readable media for facilitating enforcement of PRL restrictions. Utilizing embodiments hereof, a portion of a network, such as a data session registrar, is utilized to enforce PRL restrictions such that a mobile device is restricted from using an unauthorized or inappropriate network. Upon a user device requesting a data session, the data session registrar can verify that the network being attempted for use by the user device is appropriate by comparing an indication of the selected network to a list of preferred and/or prohibited networks maintained remote from the user device.

Accordingly, in one aspect, embodiments of the present invention is directed to one or more computer-readable storage media having computer-executable instructions embodied thereon that, when executed, perform a method for facilitating enforcement of PRL restrictions. The method includes receiving a registration request from a user device. The registration request includes a device identifier that identifies the user device and a network identifier that identifies a network selected for use by the user device. The device identifier is used to reference a list of networks permitted for use by the user device or prohibited for use by the user device. Thereafter, it is determined that the network selected for use by the user device is unauthorized based on a comparison of the network identifier that identifies the network selected for use by the user device to the list of networks permitted or prohibited for use by the user device. Based on the determination that the network selected for use by the user device is unauthorized, the user device is prevented from utilizing the selected network for voice or data services.

In another aspect, embodiments of the present invention are directed to one or more computer-readable storage media having computer-executable instructions embodied thereon that, when executed, perform a method for facilitating enforcement of PRL restrictions. The method includes receiving a registration request from a user device. The registration request including a network identifier comprising at least a system identification code (SID) indicating a network selected to provide one or more services to the user device. A preferred roaming list identifier associated with the user device is obtained. The preferred roaming identifier is used to obtain a preferred roaming list, or details associated therewith, that is designated for the user device, wherein the preferred roaming list, or details associated therewith, includes a list of preferred networks and prohibited networks corresponding with the user device identified at least by a set of system identification codes. The SID indicating the network selected to provide the one or more services to the user device is compared to the set of SIDs indicating the preferred networks and the prohibited networks. Based on the comparison, a determination is made as to whether the network selected to provide the one or more services to the user device is an authorized network. When the selected network is an authorized network, the user device is enabled to utilize the one or more services. When the selected network is an unauthorized network, the user device is prevented from utilizing the one or more services.

In yet another aspect, embodiments of the present invention are directed to a system for facilitating enforcement of PRL restrictions. The system includes a user device that utilizes a preferred roaming list stored at the user device to select a network for providing one or more services to the user device. The system also includes a data session registrar configured to receive a registration request provided by the user device that includes an indication of the selected network; compare the indication of the selected network to a list of one or more preferred or prohibited networks corresponding with the user device, wherein the list of the one or more preferred or prohibited networks is obtained from a network component remote from the user device; based on the comparison, determine that the selected network is not permitted for use by the user device; and deny registration for the user device.

Throughout the description of embodiments of the present invention, several acronyms and shorthand notations are used to aid the understanding of certain concepts pertaining to the associated methods, systems, and computer-readable media. These acronyms and shorthand notations are solely intended for the purpose of providing an easy methodology of communicating the ideas expressed herein and are in no way meant to limit the scope of the present invention. The following is a list of these acronyms:

3G Third Generation Mobile Telecommunications
    4G Fourth Generation Mobile Telecommunications
    CD-ROM Compact Disk Read Only Memory
    CDMA Code Division Multiple Access
    GPRS General Packet Radio Service
    GSM Global System for Mobile communications: originally from Groupe Spécial Mobile
    DVD Digital Versatile Discs
    EEPROM Electrically Erasable Programmable Read Only Memory
    HSDPA High-Speed Downlink Packet Access
    LTE Long Term Evolution
    MCC Mobile Country Code
    MNC Mobile Network Code
    NID Network Identification Code
    PC Personal Computer
    PDA Personal Digital Assistant
    PRL Preferred Roaming List
    RAM Random Access Memory
    ROM Read Only Memory
    SID System Identification Code
    TDMA Time Division Multiple Access
    UMTS Universal Mobile Telecommunications System
    VOIP Voice Over Internet Protocol
    WiMAX Worldwide Interoperability for Microwave Access Further, various technical terms are used throughout this description. An illustrative resource that fleshes out various aspects of these terms can be found in Newton's Telecom Dictionary, 25th Edition (2009).

Embodiments of the technology may take the form of, among other things: a method, system, or set of instructions embodied on one or more computer-readable media. Computer-readable media include both volatile and nonvolatile media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Referring to the drawings in general, and initially to FIG. 1 in particular, a block diagram of an illustrative communications device according to one embodiment is provided and referenced generally by the numeral 100. Although some components are shown in the singular, they may be plural. For example, communications device 100 might include multiple processors or multiple radios, etc. As illustratively shown, communications device 100 includes a bus 110 that directly or indirectly couples various components together including memory 112, a processor 114, a presentation component 116, a radio 117 (if applicable), input/output ports 118, input/output components 120, and a power supply 122.

Memory 112 might take the form of memory components previously described. Thus, further elaboration will not be provided here, only to say that memory component 112 can include any type of medium that is capable of storing information (e.g., a database). A database can be any collection of records. In one embodiment, memory 112 includes a set of embodied computer-executable instructions 113 that, when executed, facilitate various aspects disclosed herein. These embodied instructions will variously be referred to as "instructions" or an "application" for short.

Processor 114 might actually be multiple processors that receive instructions and process them accordingly. Presentation component 116 includes the likes of a display, a speaker, as well as other components that can present information (such as a lamp (LED), or even lighted keyboards).

Numeral 117 represents a radio(s) that facilitates communication with a wireless-telecommunications network. Illustrative wireless telecommunications technologies include CDMA, GPRS, TDMA, GSM, and the like. Radio 117 might additionally or alternatively facilitate other types of wireless communications including Wi-Fi, WiMAX, LTE, or other VoIP communications. As can be appreciated, in various embodiments, radio 117 can be configured to support multiple technologies and/or multiple radios can be utilized to support multiple technologies.

Input/output port 118 might take on a variety of forms. Illustrative input/output ports include a USB jack, stereo jack, infrared port, proprietary communications ports, and the like. Input/output components 120 include items such as keyboards, microphones, speakers, touch screens, and any other item usable to directly or indirectly input data into communications device 100. Power supply 122 includes items such as batteries, fuel cells, or any other component that can act as a power source to power communications device 100.

As previously mentioned, embodiments of the present invention provide systems, methods, and computer-readable media for facilitating enforcement of PRL restrictions. In some cases, customers can generate large data tonnage while roaming in areas explicitly restricted in the PRL assigned to the subscriber. As high speed, enhanced data networks are deployed and over the top (OTT) multimedia services proliferate (e.g., VOIP), such use can become rather expensive. Relying solely on the mobile device to enforce the PRL restrictions to specific system and/or network identifiers can result in inappropriate use explicitly restricted in the PRL. By way of example only, a PRL stored at a user device may be systematically compromised to modify the authorized PRL or an on-board network selection algorithm(s) may be compromised resulting in an inappropriate selection and/or acquisition of a network.

Accordingly, embodiments described herein are directed to facilitating network enforcement of PRL restrictions set forth for a particular user device. In other words, embodiments herein enable enforcement of accurate network selection by a user device in cases that the user device selected a restricted, unauthorized, or inappropriate network to provide services (e.g., data and/or voice services). Such a selection of a restricted, unauthorized, or inappropriate network may occur at the user device due to malware, abuse, or systematic failures (e.g., corrupted PRL, stale PRL, missing PRL, etc.).

A preferred roaming list (PRL) enables a user device to select a best or preferred roaming network for providing data and/or voice services in the event a home network is unavailable or providing reduced services. That is, a PRL enables a user device to select a roaming carrier or partner with whom the home carrier has a cost-saving roaming agreement, rather than using non-affiliated carriers. Generally, the user device service provider will set up roaming agreements with other service providers in different geographic regions and the PRL attempts to identify one of these providers' networks first when the home service provider is unavailable. The PRL assists the user device in the acquisition and system selection process as governed by the system determination algorithms of the particular implementation. The PRL informs the device's system determination function as to which networks or systems are permitted, preferred, and/or prohibited.

The PRL associated with a user device indicates places or geographical locations that the user device can roam and networks that can be used when the user device is not using the home network to which it is subscribed. In this regard, a PRL can reside in a database or memory of a wireless user device (e.g., a CDMA wireless device) and contains data used during a network selection and/or acquisition process. A PRL can include an acquisition table that includes an indexed list of frequencies on which to search for particular systems or networks.

As previously described, a PRL contains data to facilitate network or system selection and/or acquisition for the user device. Although selection of a "network" will generally be referred to throughout, a "system" or "carrier" may alternatively be used herein to refer to a particular network. In this way, a PRL can facilitate system or carrier selection associated with a network. To facilitate network selection, a PRL contains a list of networks (e.g., systems or carriers) that the user device is permitted to access and that the user device is restricted or forbidden to access. Such a list can be referred to as a system table. Such a system table can indicate one or more networks the user device is permitted to use or is preferred to use (preferred systems) and/or one or more networks the user device is not permitted to use (negative systems). Accordingly, a PRL may contain a list including one or more permitted networks and one or more prohibited networks. Permitted networks can have relative priority with respect to one another (e.g., within a geographic region) effectively making some networks more preferred than others. Such permitted or preferred networks may be referred to herein as PRL permissions, and such prohibited networks may be referred to herein as PRL restrictions.

PRL restrictions and/or PRL permissions can be identified in any manner. That is, a PRL can indicate one or more prohibited networks and one or more permitted networks in any manner that provides such an indication. In one embodiment, a network can be identified using a SID and/or NID. A system identification code (SID) is a 15-bit binary number that can be represented by a five-digit decimal number. A SID is used by a network to identify itself such that a user device can make a determination on whether or not to connect to the network and whether or not it is roaming. Each SID is globally unique and assigned to a particular carrier or network. A SID is allocated to a carrier or network, for example, by its national telecommunications authority or an appointed agent. In this regard, each carrier or network (e.g., Sprint®, Verizon Wireless®, Alltel®) has a unique SID to identify such a carrier or network. Accordingly, a SID can be listed within a PRL to indicate a preferred network or a prohibited network.

A NID is a network identification code that is a 16-bit binary number that can be represented by a five-digit decimal number. A NID is used to subdivide the SID namespace. Each NID is unique to a particular SID. A NID is locally assigned and administered by the operator or carrier owning the SID.

Although SIDs and/or NIDs are generally used herein to identify particular network, or a portion thereof, such identifiers are not intended to limit the scope of embodiments of the invention and other indications of a network or a portion of a network can be utilized in implementation of embodiments of the present invention. For example, MCC and/or MNC can be utilized to indicate particular restricted or permitted networks. Base stations may also broadcast an MCC and MNC which can also be used by the PRL. A MCC or mobile country code identifies a country in which a network operates. A MNC or mobile network code identifies a particular network within a mobile country code. Such a MNC is unique within a particular MCC.

Figure 2:
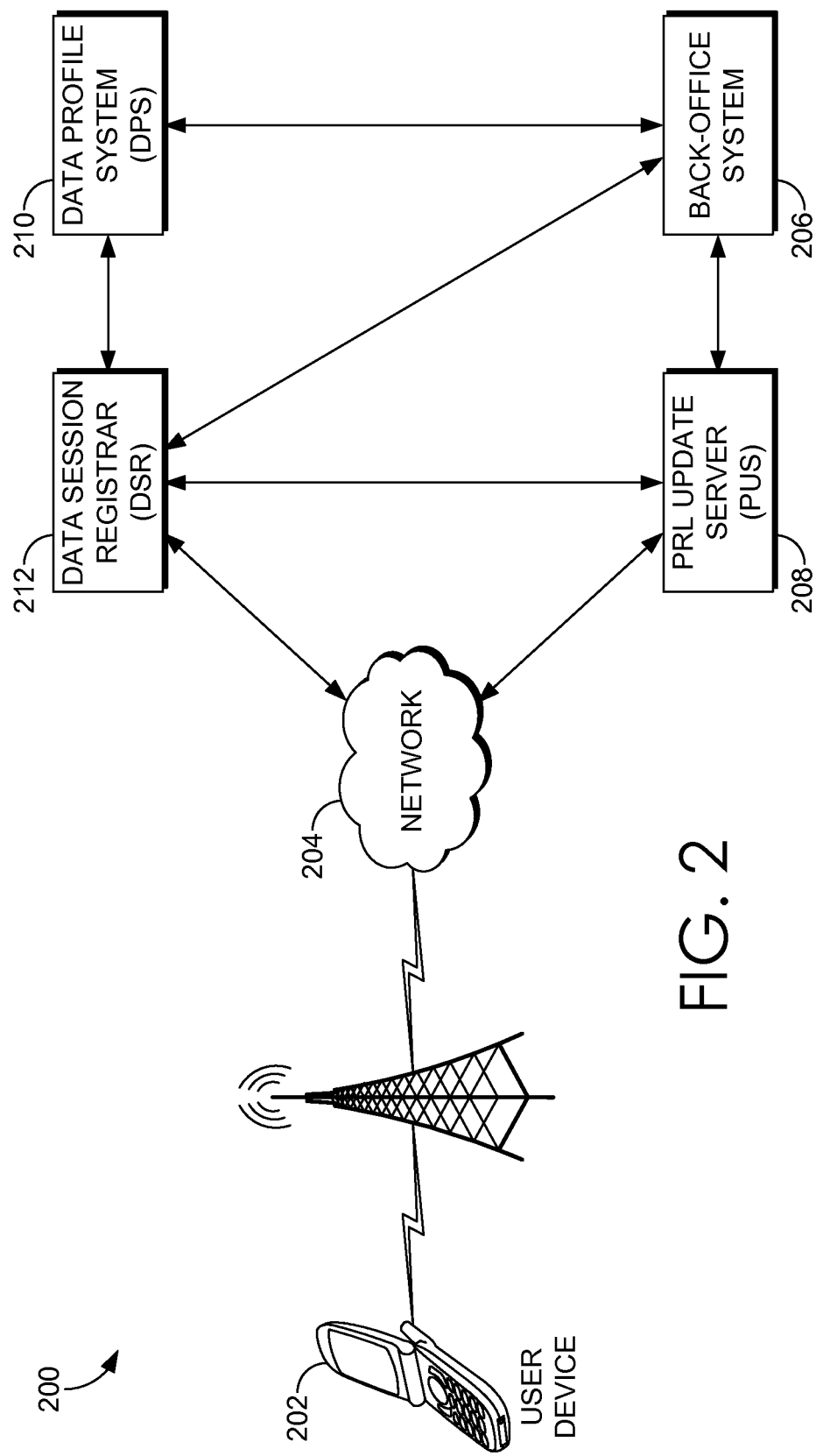
FIG. 2 is a schematic view of an exemplary network environment suitable for use in implementing embodiments of the present invention.

FIG. 2 provides an exemplary network environment suitable for use in implementing embodiments of the present invention. Such a network environment is illustrated and designated generally as network environment 200. Network environment 200 is but one example of a suitable network environment and is not intended to suggest any limitation as to the scope of use or functionality of the invention. Neither should the network environment be interpreted as having any dependency or requirement relating to any one or combination of components illustrated.

In the network environment 200, a user device 202 may communicate with other devices, such as mobile devices, servers, etc. The user device 202 may take on a variety of forms, such as a personal computer (PC), a laptop computer, a tablet, a netbook, a mobile phone, a Smart phone, a personal digital assistant (PDA), or any other device that is cable of communicating with other devices. For example, the user device 202 can take on any form, such as, for example, a mobile device or any other computing device capable of wirelessly communicating with the other devices using a network. Makers of illustrative devices include, for example, Research in Motion, Creative Technologies Corp., Samsung, Apple Computer, and the like. A device can include, for example, a display(s), a power source(s) (e.g., a battery), a data store(s), a speaker(s), memory, a buffer(s), and the like. In embodiments, a user device comprises a wireless or mobile device with which a wireless telecommunication network(s) can be utilized for communication (e.g., voice and/or data communication). In this regard, the user device can be any mobile computing device that communicates by way of, for example, a 3G or 4G network.

The user device 202 can utilize network 204 to communicate with other computing devices (e.g., a mobile device(s), a server(s), a personal computer(s), etc.). In embodiments, the network 204 is a telecommunications network(s), or a portion thereof. A telecommunications network might include an array of devices or components, some of which are not shown so as to not obscure more relevant aspects of the invention. Components such as terminals, links, and nodes (as well as other components) can provide connectivity in some embodiments. Network 204 can include multiple networks, as well as being a network of networks, but is shown in more simple form so as to not obscure other aspects of the present invention. The network 204 can be part of a telecommunication network that connects subscribers to their immediate service provider. In embodiments, the network 204 can be associated with a telecommunications provider that provides services to user devices, such as user device 202. For example, the network 204 may provide voice services to user devices or corresponding users that are registered or subscribed to utilize the services (e.g., the network 204) provided by a telecommunications provider. The network 204 can be any communication network providing voice and/or data service(s), such as, for example, a 1× circuit voice, a 3G network (e.g., CDMA, CDMA2000, WCDMA, GSM, UMTS), or a 4G network (WiMAX, LTE, HSDPA).

The network 204 can be a roaming access network or a home network. A home network refers to a network associated with a wireless telecommunications network to which the user device 202 is subscribed. A roaming access network refers to a network associated with a wireless telecommunications network to which the user device 202 is not subscribed but can be utilized based on a relationship between the roaming access network and the home network. As previously discussed, a particular roaming access network that can be utilized by a user device can be specified in a PRL that is stored at the user device 202.

In implementation, a back-office system 206 is utilized to generate new accounts and/or update account changes associated with a user device or a user thereof. A back-office system 206 can include any number of computing devices configured to manage PRL assignments based on, for example, customer subscriptions, service plans, and home area. For example, the back-office system 206 may restrict pre-paid customers to low cost access networks. A back-office system 206 can acquire data from any number of user interfaces with which customers, service provider representatives (e.g., sales representatives, etc.) can interact and input data. For example, a subscriber management agent, such as a customer care advocate or service provider representative, may access a web portal through which data can be entered or modified. That is, a subscriber management agent can interact with a customer and generate an account or perform account changes, such as a service plan, a device change, an account address, etc.

In embodiments, an account change or account initialization (i.e., an initial setup of an account) might trigger a rule or set of rules that results in an optimized PRL. That is, an initial setup for an account can result in a PRL being issued for a corresponding user device or account modification can result in an updated PRL being issued for a corresponding user device. For instance, an account change may occur that requires PRL restrictions and/or PRL permissions to be modified thereby resulting in a new or updated PRL. The back-office system 206 can detect or determine when a new or modified PRL results for a user device, such as user device 202. In such a case, a profile update may only be provided when a new or modified PRL, or details associated therewith, is to be provided to a user device. For example, in accordance with a user switching from one data service package to another data service package, the back-office system might recognize that a PRL update is to be provided to the user device based on the service package change and thereby provide a profile update to the PRL update server 208 and/or data profile system 210.

In accordance with a new or modified PRL to be associated with a user device, the back-office system 206 can provide a profile update to the PRL update server 208 and/or data profile system (DPS) 210. As previously described, a profile update may be issued or provided based on a new PRL for a user device or a modified/updated PRL for a user device. A profile update may include, for example, a device identifier and a PRL identifier. A device identifier refers to any identification of a particular user device or user associated therewith. A PRL identifier refers to any identifier or indication of a PRL. In embodiments, each subscriber associated with a particular subscription or level might be assigned the same PRL identifier. Accordingly, the back-office system 206 can provide an indication of the particular PRL, or details associated therewith, that is to be or should be employed by a particular mobile device.

In embodiments, the profile update is provided to the DPS 210 to support network enforcement of the assigned PRL, as described more fully below. Upon the DPS 210 receiving or otherwise obtaining the profile update, such a profile update can be stored.

The PRL update server 208 generally manages PRLs and provides PRLs (e.g., new PRLs or updated PRLs) to appropriate user devices. That is, the PRL update server 208 can engage user devices to modify the corresponding PRL databases. In this regard, the PRL update server 208 may include device data such that the appropriate user device can be contacted. Further, the PRL update server 208 can include a mapping or index of PRL identifiers to PRL details, such as PRL permissions and PRL restrictions associated with a particular PRL identifier.

The PRL update server 208 obtains the profile update, for example, including a device identifier and a PRL identifier. Upon obtaining the PRL update, the PRL update server 208 can utilize the PRL identifier to identify or determine an appropriate PRL (e.g., new or updated PRL) to be utilized by the user device. After identifying an appropriate PRL to be utilized by the user device, the PRL update server 208 communicates with the user device 202 to provide the updated or new PRL, or details associated therewith. For example, in some cases, a new or updated PRL might be provided to the user device 202. In other cases, one or more PRL details, such as an indication of one or more permissible networks and/or one or more prohibited networks, can be provided to the PRL residing at the mobile device. For instance, the PRL update server 208 might provide any new or altered data to the user device 202 such that the PRL database of the user device 202 is modified accordingly. As can be appreciated, the PRL update server 208 may communicate with the user device 202 in any manner including, for example, by way of a SMS message that provides an indication to the mobile device to engage with the PRL update server 208.

In some embodiments, a PRL, or details associated therewith, is automatically provided to the user device 202 in response to receiving a profile update from the back-office system 206. In other embodiments, the PRL update server 208 recognizes whether a new or updated PRL, or associated details, should be provided to the user device 202. For instance, the PRL update server 208 may determine that a PRL update is necessary and thereby provide a new or updated PRL to the user device 202. In another example, the PRL update server 208 may identify the modified portion of the PRL and provide such a modification to the user device 202.

Upon receiving the appropriate PRL, or PRL details, a PRL database residing at the user device 202 is updated accordingly. As such, the PRL database associated with the user device 202 includes the description of the PRL that has been assigned to the services for which the user has registered or subscribed. The user device 202 may receive a new or updated PRL to replace an existing PRL. Alternatively, the user device 202 may receive a PRL detail(s) such that the existing PRL can be modified in accordance with the appropriate PRL detail so that the user device 202 includes a PRL that has been appropriately assigned to the device.

Now assume that the user device 202 attempts to utilize voice and/or data services. Accordingly, the user device 202 can perform network selection and/or acquisition using its PRL assigned to the device. As can be appreciated, in some cases, such a selection is an accurate network selection based on an appropriate PRL. In other cases, such a selection may be inappropriate due to, for example, an outdated or corrupted table, a faulty selection algorithm, etc.

In performing network selection and/or acquisition, the user device 202 can listen for a signal(s) (e.g., provided by one or more base stations). If the user device receives a signal, the device looks at the network identifiers (e.g., SID and/or NID) (being carried by the signal), and compares it with network identifiers (e.g., SIDs and/or NIDs) in the PRL to determine which network to select for utilization.

Upon selecting a network, the user device 202 initiates and communicates a registration request to the data session registrar (DSR) 212. The registration request provides an indication of to register for services provided by a network. That is, a registration requests provides a request to connect to a particular network. The registration request can include a device identifier and a network identifier(s), such as a selected or serving SID and/or NID. In other words, the registration request may include details of the network infrastructure serving the requesting device (e.g., serving SID/NID).

The data session registrar (DSR) 212 generally performs regular session grant and/or deny operations. In implementation, the DSR 212 receives the registration request including the network identifier(s). Upon receiving the registration request, the DSR 212 can verify that the selected network is authorized or permitted. In other words, the DSR 212 can determine whether the selected network is a restricted or permitted network. By way of example, the DSR 212 verifies that the serving SID/NID associated with the user device 202 is authorized as indicated in the subscriber assigned PRL. Accordingly, the DSR 212 can determine if the PRL identifier that has been assigned to the user device matches the area where the user device is roaming.

To verify utilization of the selected network, the DSR 212 can verify that the serving or selected network provided by the user device 202 matches or corresponds with an authorized PRL or PRL detail(s) for the user device 202. The authorized PRL or PRL detail(s) for the user device 202 can be obtained or referenced in any manner. For instance, such data can be stored at the data session registrar as provided by the back-office system 206, the PRL update server 208, and/or the data profile system 210. In other cases, such data can be referenced from the back-office system 206, the PRL update server 208, and/or the data profile system 210.

In one implementation, as the DSR 212 may use profile information to perform a determination of whether to accept or deny the session, the DSR 212 may obtain such profile data from the DPS 210 and/or the PRL update server 208. For example, in one embodiment, the DSR 212 may send a profile request with a device identifier to the DPS 210 and, in response, the DPS 210 can provide the profile details, including a PRL identifier, to the DSR 212. Accordingly, the DPS 210 provides the PRL identification authorized for the subscriber pending an access or usage request authorization. In such a case, in the event the DSR 212 lacks details for the designated PRL identifier, the DSR 212 can request a PRL or PRL details from the PRL update server 208 that acts as system of records for PRL details. The PRL update server 208 can accordingly share an appropriate PRL or PRL details for the PRL identifier to support the DSR 212 functionality. Accordingly, the PRL update server 208 might provide a list of permitted and/or restricted network identifiers, such as SIDs and/or NIDs, associated with the PRL identifier indicated in the request communicated from the DSR 212.

Upon the DSR 212 receiving a PRL or PRL details, such as permitted and/or restricted SIDs/NIDs for the particular user device 202, the DSR 212 can use such data to verify whether the network (e.g., indicated by way of SID and/or NID) currently serving or selected for the requesting user device 202 matches any authorized or permitted network assigned to the user device 202. In this way, the DSR 212 can compare PRL details shared by the PRL update server 208 to the serving or selected network identifier to identify a match. In some cases, the selected network might match a permitted network assigned to the user device 202 resulting in registration acceptance by the DSR 212. In other cases, the selected network might match a restricted network assigned to the user device 202 resulting in registration failure by the DSR 212. In yet other cases, the selected network might not match any network identifier within the PRL assigned to the user device 202 resulting in a registration failure by the DSR 212.

In embodiments, when the DSR 212 identifies usage of an authorized or permitted network, the DSR 212 can accept the request. Accordingly, the DSR 212 can permit a session in accordance with the selected network and the user device 202 can utilize the selected network.

In embodiments, when the DSR 212 identifies usage of an unauthorized or restricted network, the DSR 212 can reject the request. Accordingly, the DSR 212 can indicate a registration failure to the user device 202. For instance, identification of an unauthorized or restricted network may occur when the selected network does not match any network identifier within PRL that is authorized for the device or when the selected network matches a restricted network authorized for the user device. Further, in some cases, the DSR 212 might identify and share any allowed or permitted networks by way of the access rejection message or another message to the user device. The user device can then utilize one of the permitted networks.

Additionally, the DSR 212 may alert the back-office system 206, or other component, of any mismatch, non-match, matching of a restricted network, that could represent abuse or fraud to the PRL or algorithms functioning at the user device. Such a fraud alert provided to the back-office system 206 may trigger an attempt to synchronize the user device with the appropriate PLR (e.g., pushing to the device the appropriate SID/NID list from the PRL). A fraud alert may additionally or alternatively trigger other security processes, which include but are not limited to geographical/regional failure pattern analysis, potential fraud or abuse tracking, compliance, penalty assessments, etc.

As can be appreciated, DSR 212 is not required to communicate with the DPS 210 and/or the PRL update server 208. In this regard, the DSR 212 may communicate with such components in response to each registration request received from a user device, upon an occurrence of an event (e.g., a lapse of a timer period, upon a particular number of received registration requests, etc.), or an initial instance, or, alternatively, may not communicate at all with such components. In one example, the DSR 212 may include a cache containing a mapping of PRL identifiers to a list of corresponding SIDs/NIDs (e.g., permitted and/or restricted). In such a case, upon receiving a registration request from a user device, the DSR 212 can utilize the device identifier to reference the authorized PRL for the identifier as well as the list of permitted and/or restricted networks (e.g., identifies by SIDs and/or NIDs).

Turning now to FIG. 3, a flow diagram is shown illustrating a first exemplary method 300 for facilitating enforcement of PRL restrictions, in accordance with an embodiment of the present invention. In embodiments, method 300 can be performed using a back-office system, such as the back-office system 206 illustrated in FIG. 2.

Initially, at block 310, generation of a new account for a user device or an account modification for the user device is identified. In embodiments, such an identification might occur based on such data being generated or modified in association with a user account corresponding with a device. For example, a customer representative or a customer may utilize a user interface to input or modify data associated with a user account, such as a service plan for the device. At block 312, an appropriate PRL to be assigned to the user device is identified. In this way, a PRL associated with a particular service plan or level of service might be designated to be assigned to the user device. At block 314, a profile update is provided in association with the user device. Such a profile update includes a device identifier that identifies the user device and a PRL identifier that identifies the PRL to be assigned to the user device.

With reference to FIG. 4, a flow diagram is shown illustrating a second exemplary method 400 for facilitating enforcement of PRL restrictions, in accordance with an embodiment of the present invention. In embodiments, method 400 can be performed using a PRL update server, such as the PRL update server 208 illustrated in FIG. 2.

Initially, at block 410, a profile update associated with a user device is received. Such a profile update can include a PRL identifier that identifies a particular PRL to be employed by a user device. At block 412, a PRL or one or more PRL details (e.g., permitted and/or restricted networks) associated with the PRL identifier is referenced. It is recognized, at block 414, that the PRL or the PRL details(s) should be provided to the user device. For instance, such a recognition might be based on received data or based on a comparison of PRL currently stored at the user device. At block 416, the PRL or PRL detail(s) is provided to the user device.

At a later time, a request for a PRL or the PRL detail(s) associated with the user device is received. Such a request can be communicated, for example, from the data session registrar 212 of FIG. 2. In response to the request, the PRL or the PRL detail(s) is provided to the requesting component (e.g., data session registrar 212).

Turning now to FIG. 5, a flow diagram is shown illustrating a third exemplary method 500 for facilitating enforcement of PRL restrictions, in accordance with an embodiment of the present invention. In embodiments, method 500 can be performed using a user device, such as the user device 202 illustrated in FIG. 2.

Initially, at block 510, a PRL or one or more PRL details are received. In some cases a new or modified PRL might be received. In other cases, a PRL detail to be updated might be received. At block 512, the PRL or PRL detail(s) is stored at the user device. As indicated at block 514, a network is selected for utilization by the user device. The network selection performed by the device can reference the PRL to identify or select a network for utilization by the device. Thereafter, at block 516, a registration request is generated. Such a request includes a device identifier and a network identifier that identifies the selected network. A registration failure is received, at block 518, indicating that the selected network is unauthorized. Such a registration failure is provided based on the selected network not corresponding with a permitted network(s).

Figure 6:
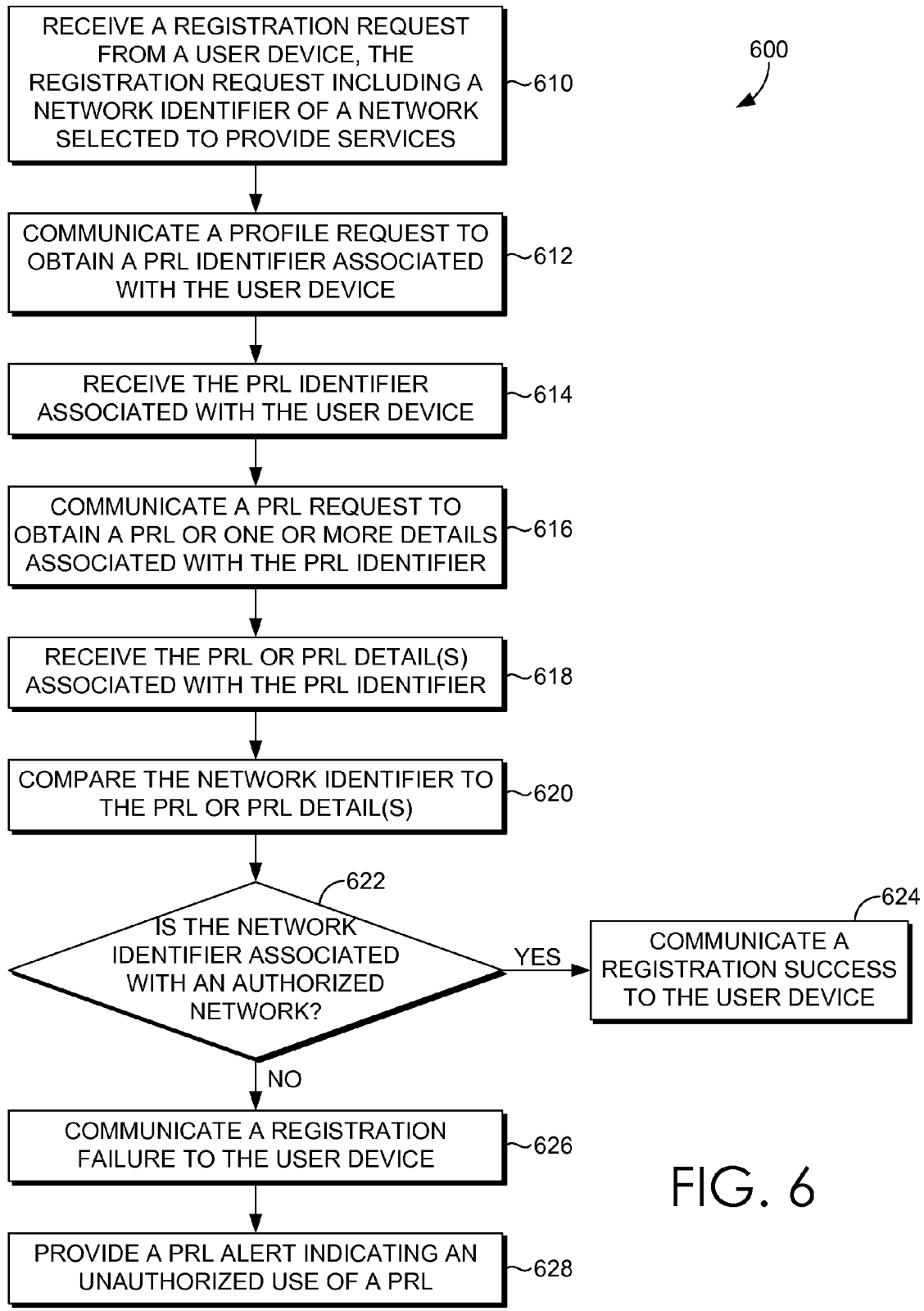
FIG. 6 provides a fourth exemplary method for facilitating enforcement of PRL restrictions, in accordance with an embodiment of the present invention.

Referring to FIG. 6, a flow diagram is shown illustrating a fourth exemplary method 600 for facilitating enforcement of PRL restrictions, in accordance with an embodiment of the present invention. In embodiments, method 600 can be performed using a data session registrar, such as the data session registrar 212 illustrated in FIG. 2.

Initially, at block 610, a registration request is received from a user device. Such a registration request can include a network identifier of a network selected to provide services. Subsequently, at block 612, a profile request is communicated to obtain a PRL identifier associated with the user device. Such a profile request can be communicated, for instance, to a data profile system that includes PRL identifiers associated with user devices. At block 614, the PRL identifier associated with the user device is received. Based on the PRL identifier, at block 616, a PRL request is communicated to obtain a PRL or one or more PRL details associated with the PRL identifier. In this regard, the PRL request can be communicated to PRL update server to obtain such data.

Thereafter, at block 618, the PRL or PRL detail(s) associated with the PRL identifier is received. The network identifier corresponding with the selected network is compared to the PRL or the PRL details, such as PRL restrictions and/or permissions. This is indicated at block 620. At block 622, it is determined whether the network identifier is associated with an authorized network. In this regard, it may be determined if the network identifier of the selected network matches a network identifier associated with permitted networks or associated with restricted networks.

If it is determined that the network identifier of the selected network is associated with an authorized network, a registration success is communicated to the user device, as indicated at block 624. On the other hand, if it is determined that the network identifier of the selected network is not associated with an authorized network (i.e., is associated with a restricted network), a registration failure is communicated to the user device. This is indicated at block 626. Along with the registration failure, an indication of one or more permitted networks may also be communicated to the user device so that the user device can utilize such a network to receive voice and/or data services. At block 628, a PRL alert is provided indicating an unauthorized use of a PRL. Such a PRL alert may be communicated to a back-office system for tracking.

Figure 7:
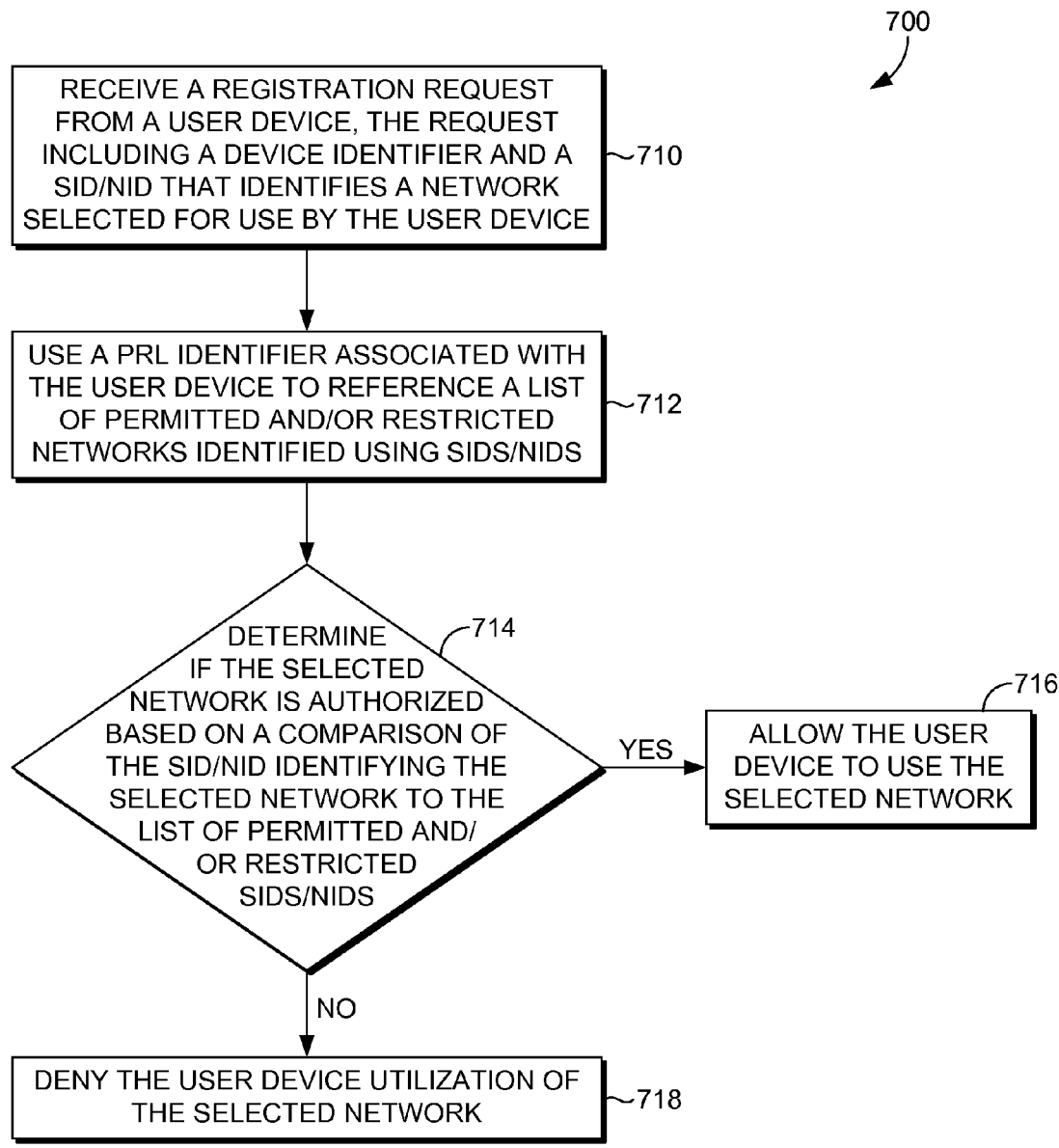
FIG. 7 provides a fifth exemplary method for facilitating enforcement of PRL restrictions, in accordance with an embodiment of the present invention.

Turning now to FIG. 7, a flow diagram is shown illustrating a fifth exemplary method 700 for facilitating enforcement of PRL restrictions, in accordance with an embodiment of the present invention. In embodiments, method 700 can be performed using a data session registrar, such as the data session registrar 212 illustrated in FIG. 2.

Initially, at block 710, a registration request is received from a user device. Such a registration request can include a device identifier and a SID/NID that identifies a network selected for use by the user device. Subsequently, at block 712, a PRL identifier associated with the user device is used to reference a list of permitted and/or restricted networks identified using SIDs/NIDs. As indicated at block 714, a determination is made as to whether the selected network is authorized based on a comparison of the SID/NID identifying the selected network to the list of permitted and/or restricted SIDs/NIDs. If the selected network is authorized, the user device is allowed to use the selected network, as indicated at block 716. If, on the other hand, the selected network is not authorized, the user device is denied utilization of the selected network. This is indicated at block 718.

Figure 8:
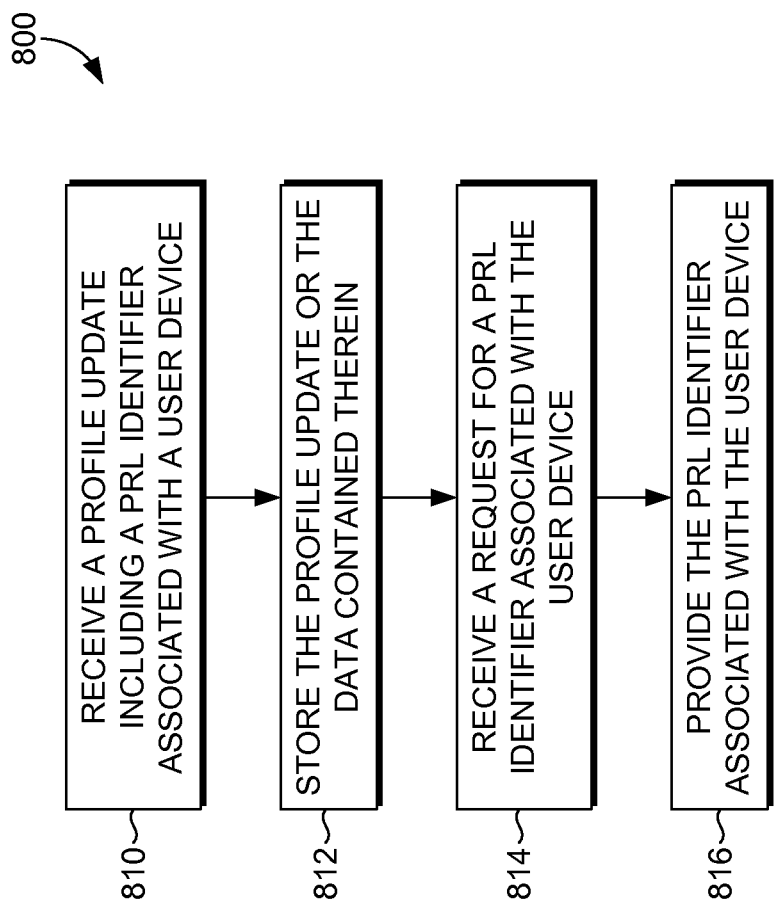
FIG. 8 provides a sixth exemplary method for facilitating enforcement of PRL restrictions, in accordance with an embodiment of the present invention.

With reference now to FIG. 8, a flow diagram is shown illustrating a sixth exemplary method 800 for facilitating enforcement of PRL restrictions, in accordance with an embodiment of the present invention. In embodiments, method 800 can be performed using a data profile system, such as the data profile system 210 illustrated in FIG. 2.

Initially, at block 810, a profile update including a PRL identifier associated with a user device is received. Such a profile update can be provided, for example, by a back-office system upon recognition of a new or modified PRL to be associated with a user device. At block 812, the profile update, or data contained therein, is stored. Subsequently, at block 814, a request for a PRL identifier associated with the user device is received. Such a request can be communicated from a data session registrar being utilized to enforce PRL restrictions. Based on the request, the PRL identifier associated with the user device is referenced and provided to the requesting component, as indicated at block 816.

It will be understood by those of ordinary skill in the art that the order of steps shown in the method 300 of FIG. 3, method 400 of FIG. 4, method 500 of FIG. 5, method 600 of FIG. 6, method 700 of FIG. 7, and method 800 of FIG. 8 is not meant to limit the scope of the present invention in any way and, in fact, the steps may occur in a variety of different sequences within embodiments hereof. Any and all such variations, and any combination thereof, are contemplated to be within the scope of embodiments of the present invention.

Many different arrangements of the various components depicted, as well as components not shown, are possible without departing from the scope of the claims below. Embodiments of our technology have been described with the intent to be illustrative rather than restrictive. Alternative embodiments will become apparent readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What is claimed is:

1. One or more non-transitory computer-readable storage media having computer-executable instructions embodied thereon that, when executed, perform a method for facilitating enforcement of PRL restrictions, the method comprising:
   receiving a registration request from a user device, the registration request comprising a device identifier that identifies the user device and a network identifier that identifies a network selected for use by the user device;
   using the device identifier to reference a preferred roaming list (PRL) assigned to the user device, the PRL comprising a list of networks permitted for use by the user device or prohibited for use by the user device;
   remote from the device, determining that the network selected for use by the user device is unauthorized based on a comparison of the network identifier that identifies the network selected for use by the user device to the list of networks permitted or prohibited for use by the user device; and
   based on the determination that the network selected for use by the user device is unauthorized, preventing the user device from utilizing the selected network for voice or data services.

2. The media of claim 1, wherein the device identifier is used to obtain a preferred roaming list (PRL) identifier associated with the use device.

3. The media of claim 2, wherein the preferred roaming list (PRL) identifier is used to obtain the list of networks permitted for use by the user device or prohibited for use by the user device.

4. The media of claim 1, wherein the selected network is determined to be unauthorized based on the network identifier associated with the selected network matching a network identifier included in the networks prohibited for use by the device.

5. The media of claim 1, wherein the selected network is determined to be unauthorized based on the network identifier associated with the selected network not matching any network identifiers included in the networks permitted for use by the user device.

6. The media of claim 1 further comprising providing one or more permitted networks to the user device.

7. The media of claim 1 further comprising providing an alert to another component to indicate a potential fraudulent activity performed at the user device.

8. One or more non-transitory computer-readable media having computer-executable instructions embodied thereon that, when executed, perform a method for facilitating enforcement of PRL restrictions, the method comprising:
   receiving a registration request from a user device, the registration request including a network identifier comprising at least a system identification code (SID) indicating a network selected to provide one or more services to the user device;
   obtaining a preferred roaming list identifier associated with the user device;
   using the preferred roaming list identifier to obtain a preferred roaming list, or details associated therewith, that is designated for the user device, wherein the preferred roaming list, or details associated therewith, includes a list of preferred networks and prohibited networks corresponding with the user device identified at least by a set of SIDS;
   remote from the user device, comparing the at least the SID indicating the network selected to provide the one or more services to the user device to the set of SIDs indicating the preferred networks and the prohibited networks from the preferred roaming list; and
   based on the comparison, determining whether the network selected to provide the one or more services to the user device is an authorized network, wherein
   when the selected network is an authorized network, enabling the user device to utilize the one or more services, and
   when the selected network is an unauthorized network, preventing the user device from utilizing the one or more services.

9. The media of claim 8, wherein the network identifier further comprises a network identification code (NID).

10. The media of claim 8, wherein the preferred roaming list identifier is obtained from a data profile system.

11. The media of claim 8, wherein the preferred roaming list, or details associated therewith, is obtained from a PRL update server that manages user device preferred roaming list updates.

12. The media of claim 8, wherein the list of preferred networks and prohibited networks corresponding with the user device is further identified by a set of network identification codes.

13. The media of claim 8, wherein a determination is made that the network selected to provide the one or more services to the user device is an unauthorized network based on the at least the SID indicating the selected network matching a SID within the prohibited network.

14. The media of claim 8, wherein a determination is made that the network selected to provide the one or more services to the user device is an unauthorized network based on the at least the SID indicating the selected network not matching a SID within the permitted network.

15. A system for facilitating enforcement of PRL restrictions, the system comprising:
- a user device that utilizes a preferred roaming list (PRL) stored at the user device to select a network for providing one or more services to the user device, wherein the PRL comprises a list of one or more preferred or prohibited networks corresponding with the user device; and
- a data session registrar remote from the user device configured to:
  - receive a registration request provided by the user device that includes an indication of the selected network,
  - compare the indication of the selected network to the PRL, wherein the PRL is obtained from a network component remote from the user device,
  - based on the comparison, determine that the selected network is not permitted for use by the user device, and
  - deny registration for the user device.

16. The system of claim 15, wherein the indication of the selected network comprises a system identification code and a network identification code.

17. The system of claim 15, wherein the list of the one or more preferred or prohibited networks comprises a list of one or more system identification codes and one or more network identification codes indicated as preferred networks and one or more system identification codes and one or more network identification codes indicated as prohibited networks.

18. The system of claim 15, wherein the network component remote from the user device comprises a PRL update server that manages preferred roaming lists issued to user devices.

19. The system of claim 15, wherein the data session registrar is further configured to provide one or more permitted networks to the user device.

20. The system of claim 19, wherein the data session registrar is further configured to provide an alert indicating a potential misuse of the preferred roaming list stored at the user device.

* * * * *